UNITED STATES PATENT OFFICE.

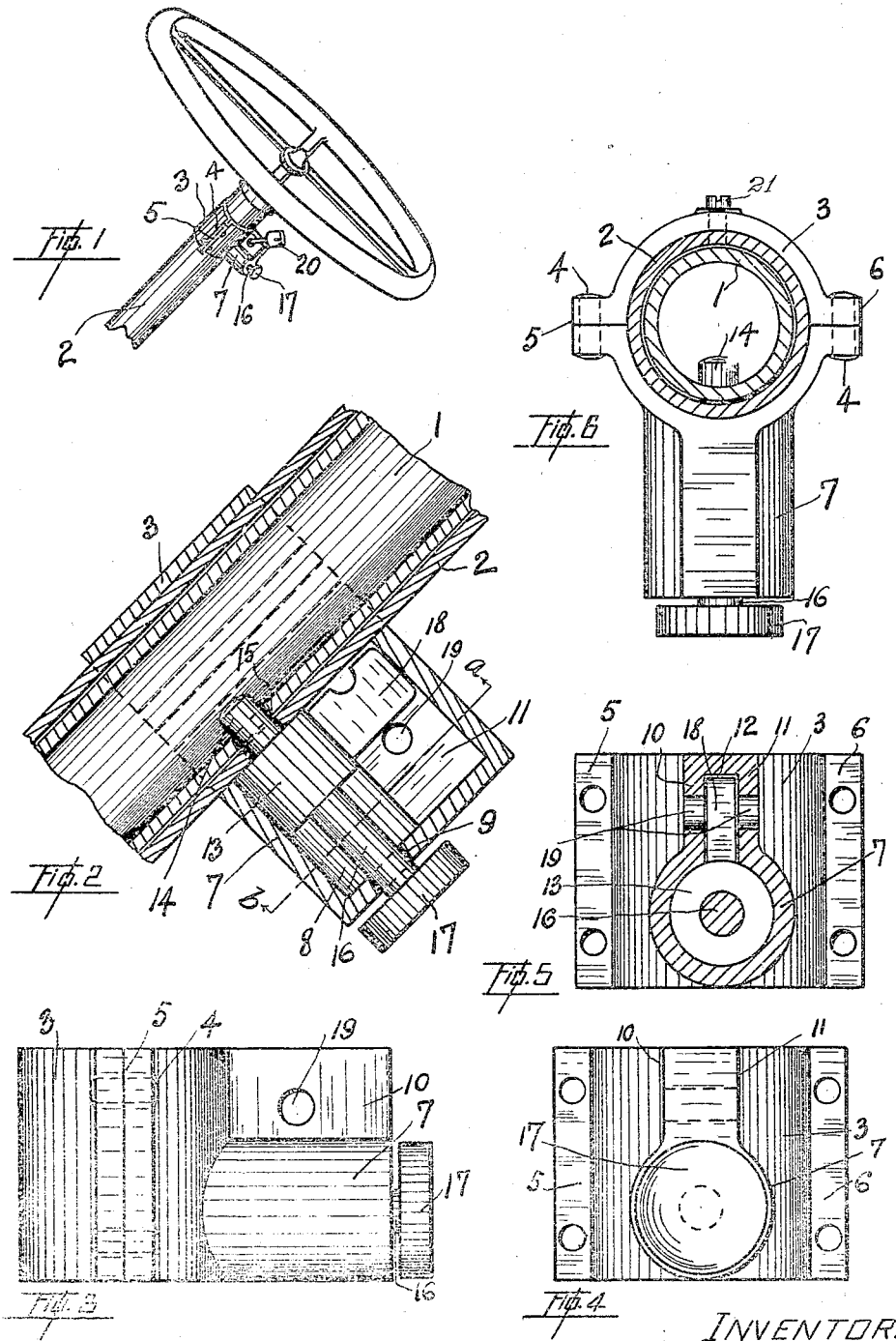

PAUL JOSEPH COTÉ, OF EBURNE, BRITISH COLUMBIA, CANADA.

AUTOMOBILE-LOCK.

1,236,914.

Specification of Letters Patent.  Patented Aug. 14, 1917.

Application filed January 6, 1917. Serial No. 140,954.

*To all whom it may concern:*

Be it known that I, PAUL JOSEPH COTÉ, a subject of the King of Great Britain, and a resident of the town of Eburne, in the Province of British Columbia, Canada, have invented certain new and useful Improvements in Automobile-Locks, of which the following is a specification.

My invention relates to improvements in automobile locks, and the object of my invention is to provide an efficient device adapted for attachment to the steering column, the use of which enables the steering shaft to be locked to the steering column when the car is stationary, the front wheels being inclined to the right or left, as the case may be, and thus prevent the wheels being brought into the straight ahead position, thus rendering it impossible for the car to be driven ahead until the lock is withdrawn.

A further object is to provide a device of this nature which is of the simplest construction, which is very strong and capable of being manufactured expeditiously and of being assembled in place with great facility, and which can not be readily tampered with or destroyed.

I attain these objects by the construction illustrated in the accompanying drawings in which—

Figure 1 is a view illustrating the practical embodiment of my invention.

Fig. 2 is a sectional view of the assembled device.

Fig. 3 is a side elevation of the device.

Fig. 4 is an end view, looking on the button.

Fig. 5 is a sectional elevation, taken through the line $a-b$ of Fig. 2.

Fig. 6 is a plan view, the steering shaft and column being shown in section.

Similar figures of reference indicate similar parts throughout the several views.

1 indicates the steering shaft of an automobile and 2 the steering column, while 3 indicates a clamp adapted to encircle the column and to be rigidly secured thereto by rivets 4 passed through the lugs 5 and 6 of the clamp, which may be further secured, if desired, by means of set screws 21 extending through it into the column, as shown in Fig. 6.

Extending outwardly from the body of the clamp at one side at its lower end is a tubular portion 7, the inner end of the bore 8 of which is open to the bore of the clamp, its outer end being closed and provided with a reduced opening 9, while formed integrally with the tubular portion 7 and the clamp body are two walls 10 and 11 respectively, which walls are closed along their top edges and outer ends and are spaced apart so that a slot 12 is formed communicating with the bore 8 and of the same length as the bore, as shown in Figs. 2 and 5, the inner end of the slot being open to the bore of the clamp.

13 indicates a member slidably mounted in the bore 8, which member is provided on its inner end with a pin 14 adapted to pass through an opening 15 in the steering column and steering shaft, as shown in Fig. 2, when the wheels are inclined to one side, while secured to the outer end of the member 13 is a pin 16 the outer end of which extends slidably through the opening 9, hereinbefore mentioned, and is provided with a button 17.

Secured to the member 13 and slidably mounted in the slot 12 is a short arm 18 which is adapted to be positioned on either one side or the other of an opening 19 formed in the walls 10 and 11 when the device is in the locked or the unlocked positions, as indicated in Fig. 2, in which the arm is shown on the inside of the opening 19, the device being in the locked position.

The manner in which the device is used and operates will be apparent, as it will be seen that the clamp 3, which is formed in two halves, may be placed on the steering column in any suitable position and permanently and rigidly secured thereto by the rivets 4 or any other suitable means. The opening 15, it will be understod, is first of all formed, after which the clamp is secured in place and the position of that part of the opening which extends through the steering shaft is determined by the rule of the road obtaining in the district in which the car is used. For instance, if the left hand side of the thoroughfare is the proper side, then in stopping the car it will be drawn up to the curb with the wheels inclined to the left, and it is with the steering shaft in this position that the opening 15 is formed by drilling through the steering column and steering shaft so that it is continuous throughout only when the wheels are inclined the desired amount to the left. The reverse is the case when the proper side is the right hand side, as then the wheels are inclined the desired amount to the right before drilling the opening 15.

Now, the hole 15 being formed, the clamp secured in place so that the hole 15 and the tubular bore 8 are concentric, and the wheels inclined to the left or right, as the case may be, it will be seen that the member 13 may be moved inwardly so that the pin 14 will pass into the opening 15 and engage the steering column and the steering shaft, the arm 18 being then positioned on the inside of the opening 19, so that the shackle of a strong padlock, indicated by the numeral 20 in Fig. 1, passed through the opening 19, will prevent the withdrawal of the pin 14 from the opening 15.

As a very strong padlock can be used, and as the device itself can be placed in a position where it is not readily accessible to breaking tools, it will be seen that it would be a very difficult operation to destroy the lock and one which could not be attempted in a public thoroughfare with any chance of success. Further, as the pin 14 is capable of being made of comparatively large size and of very strong material, it cannot be sheared off by turning the steering wheel, as the wheel would twist off before the pin would give.

The front wheels being thus maintained inclined to the left or right, as the case may be, the car can neither be driven off nor towed, as, until the device is unlocked, the wheels cannot be brought into the straight ahead position, which can only be done when the shackle of the padlock is disengaged from the opening 19, when the member 13 may be moved outwardly in the bore 8 by pulling on the button 17 so as to carry the pin 14 clear of the steering shaft and permit operation of the same. In the outmost position of the member 13 and pin 14 the arm 18 is positioned on the outside of the opening 19, so that, if the shackle of the padlock be then passed through the opening 19 and locked, the member 13 will thereby be maintained in its outmost position when the car is running.

What I claim as my invention is:—

1. The combination with an automobile steering column having an opening therein and steering shaft, of a tubular member adapted to be secured to the steering column closed at its outer end and having a reduced opening in the closure, said member being provided with a pair of walls having oppositely arranged orifices therein and closed along their upper edges and outer ends, said walls being spaced apart so that a slot is formed therebetween communicating with the bore of the tubular member, and a laterally movable member mounted in the tubular member adapted at one end to extend through the opening in the steering column into the steering shaft when moved inwardly or to be withdrawn therefrom when moved outwardly, its opposite end being extended to project slidably through the reduced opening in the said closure, said member being provided with an arm slidably engaging the said slot and adapted to be carried to opposite sides of the orifices in the said walls by the lateral movement in opposite directions of the said member.

2. A device of the class described, comprising a clamp member connected to the steering column having an outwardly extending tubular portion the bore of which at its inner end is open and is restricted at its outer end, the said tubular portion having upstanding walls having oppositely arranged orifices therein and closed along their upper edges and outer ends and spaced apart so that a slot is formed therebetween communicating with the bore of the tubular member, a laterally movable member mounted in the tubular portion having an arm slidably engaging the said slot and adapted to be carried to opposite sides of the said orifices by the lateral movement in opposite directions of the said member, engaging means between the inner end of the said member and the steering shaft, and operating means on the outer end of the said member extending through the restricted outer end of the tubular portion.

Dated at Vancouver, B. C., this 23rd day of December, 1916.

PAUL JOSEPH COTÉ.